(12) United States Patent
Haddadin et al.

(10) Patent No.: US 11,059,175 B2
(45) Date of Patent: Jul. 13, 2021

(54) SYSTEM AND METHOD FOR CONTROLLING A ROBOT

(71) Applicant: Franka Emika GmbH, Munich (DE)

(72) Inventors: Sami Haddadin, Hannover (DE); Björn Pietsch, Munich (DE)

(73) Assignee: Franka Emika GmbH, Munich (DE)

( * ) Notice: Subject to any disclaimer, the term of this patent is extended or adjusted under 35 U.S.C. 154(b) by 398 days.

(21) Appl. No.: 16/095,494

(22) PCT Filed: Apr. 21, 2017

(86) PCT No.: PCT/EP2017/059562
§ 371 (c)(1),
(2) Date: Oct. 22, 2018

(87) PCT Pub. No.: WO2017/186599
PCT Pub. Date: Nov. 2, 2017

(65) Prior Publication Data
US 2019/0091863 A1 Mar. 28, 2019

(30) Foreign Application Priority Data
Apr. 24, 2016 (DE) ...................... 10 2016 005 026.8

(51) Int. Cl.
*B25J 19/06* (2006.01)
*B25J 9/16* (2006.01)
(Continued)

(52) U.S. Cl.
CPC ............. *B25J 9/1674* (2013.01); *B25J 19/06* (2013.01); *G05B 19/042* (2013.01);
(Continued)

(58) Field of Classification Search
CPC .......................... G05B 19/042; G05B 19/406; G05B 19/4063; G05B 19/4065; G05B 9/02;
(Continued)

(56) References Cited

U.S. PATENT DOCUMENTS 4,812,973 A * 3/1989 Kinoshita ............... G06F 5/065
710/266
4,860,191 A * 8/1989 Nomura ................ G06F 9/3879
710/110

(Continued)

FOREIGN PATENT DOCUMENTS

CN          1623744 A       6/2005
CN        202453705 U       9/2012
(Continued)

OTHER PUBLICATIONS

Aoshima, Transputer circuits for robot control, 1996, IEEE, p. 1221-1226 (Year: 1996).*

(Continued)

*Primary Examiner* — McDieunel Marc
(74) *Attorney, Agent, or Firm* — Hoffmann & Baron, LLP

(57) ABSTRACT

A system for controlling a robot. The system includes: an interface that provides data DAT(t) captured by one or more sensors, wherein the data DAT(t) indicate a current state ZUS(t) of the robot, a first processor that is connected to the interface and that is set up to use a first algorithm to check, on the basis of the data DAT(t) and a prescribed state space Z, which indicates exclusively permitted states of the robot, whether it holds that: $ZUS(t) \in Z$, wherein in the event of: $ZUS(t) \notin Z$ a first stop signal Sig1 is generated, a unit, connected to the first processor via a data link, for generating a second stop signal Sig2, which generates the second stop signal Sig2 when the unit receives the first stop signal Sig1 or when the unit establishes that the data link is interrupted, a second processor, connected to the interface and the first processor or only to the first processor, that is set up to use a second algorithm to check, on the basis of the data DAT(t) and a prescribed state space Z' or a boundary for the state space Z', whether it holds that: $ZUS(t) \in Z'$, wherein in the event of $ZUS(t) \notin Z'$ the second processor prompts an inter-
(Continued)

ruption unit to interrupt the data link between the first processor and the unit, and a control unit, connected to the unit, for controlling the robot, which control unit controls/regulates the robot into a prescribed safe state when the second stop signal Sig2 is present.

17 Claims, 1 Drawing Sheet

(51) Int. Cl.
  *G05B 19/406* (2006.01)
  *G05B 19/042* (2006.01)
(52) U.S. Cl.
  CPC .. *G05B 19/406* (2013.01); *G05B 2219/34482* (2013.01); *G05B 2219/39083* (2013.01); *G05B 2219/40202* (2013.01)
(58) Field of Classification Search
  CPC .. G05B 19/00; G05B 19/0428; G05B 19/401; G05B 2219/14012; G05B 2219/23098; G05B 2219/24003; G05B 2219/24008; G05B 2219/24182; G05B 2219/24188; G05B 2219/24189; G05B 2219/24191; G05B 2219/34458; G05B 2219/39447; G05B 2219/40202; G05B 2219/40218; G05B 2219/50198; G05B 9/03; B25J 9/1674; B25J 9/1676; B25J 19/02; B25J 19/06; B25J 19/023; B25J 19/0004; Y10S 901/09; Y10S 901/15; F02D 41/004; F02M 25/08; F16P 3/12; H02H 3/20; H02H 3/207; H02H 3/24; H02H 3/26; H02H 7/10
  See application file for complete search history.

(56) References Cited

U.S. PATENT DOCUMENTS

| | | | | |
|---|---|---|---|---|
| 5,131,081 A | * | 7/1992 | MacKenna | G06F 13/126 710/22 |
| 6,778,867 B1 | | 8/2004 | Ziegler et al. | |
| 2005/0060606 A1 | | 3/2005 | Kalan et al. | |
| 2006/0004489 A1 | * | 1/2006 | Weiss | B25J 9/1656 700/245 |
| 2006/0009878 A1 | | 1/2006 | Kobayashi et al. | |
| 2007/0096674 A1 | | 5/2007 | Hashimoto et al. | |
| 2008/0150467 A1 | | 6/2008 | Hashimoto et al. | |
| 2014/0200687 A1 | | 7/2014 | Stegmaier et al. | |
| 2014/0362480 A1 | | 12/2014 | Veil et al. | |
| 2015/0073599 A1 | | 3/2015 | Yasuda et al. | |
| 2021/0016446 A1 | * | 1/2021 | Hares | B25J 9/1692 |
| 2021/0023708 A1 | * | 1/2021 | Aoyagi | B25J 9/1674 |
| 2021/0026321 A1 | * | 1/2021 | Gomez | G01K 13/02 |

FOREIGN PATENT DOCUMENTS

| | | |
|---|---|---|
| DE | 102013211422 A1 | 12/2014 |
| JP | 5-146987 A | 6/1993 |
| JP | 7-271404 A | 10/1995 |
| JP | 2001-525263 A | 12/2001 |
| JP | 2002-195899 A | 7/2002 |
| JP | 2006-178730 A | 7/2006 |
| JP | 2007-118141 A | 5/2007 |
| JP | 2007-283448 A | 11/2007 |
| JP | 2008-155298 A | 7/2008 |
| JP | 2008-213056 A | 9/2008 |
| JP | 2011-197859 A | 10/2011 |
| JP | 2014-515509 A | 6/2014 |
| KR | 10-2015-0020697 A | 2/2015 |
| WO | WO 00/62135 A1 | 10/2000 |
| WO | WO 2006/000571 A1 | 1/2006 |

OTHER PUBLICATIONS

Andersson, Systems design for robot control with a scalar supercomputer, 1990, IEEE, p. 1210-1215 (Year: 1990).*
Rutten et al., The sequencing of data flow tasks in SIGNAL: application to active vision in robotics, 1994, IEEE, p. 80-85 (Year: 1994).*
Dupourque et al., Towards multi-processor and multi-robot controllers, 1986, IEEE, p. 864-870 (Year: 1986).*
English translation of the International Preliminary Report on Patentability dated Nov. 8, 2018 for International Application No. PCT/EP2017/059562.

* cited by examiner

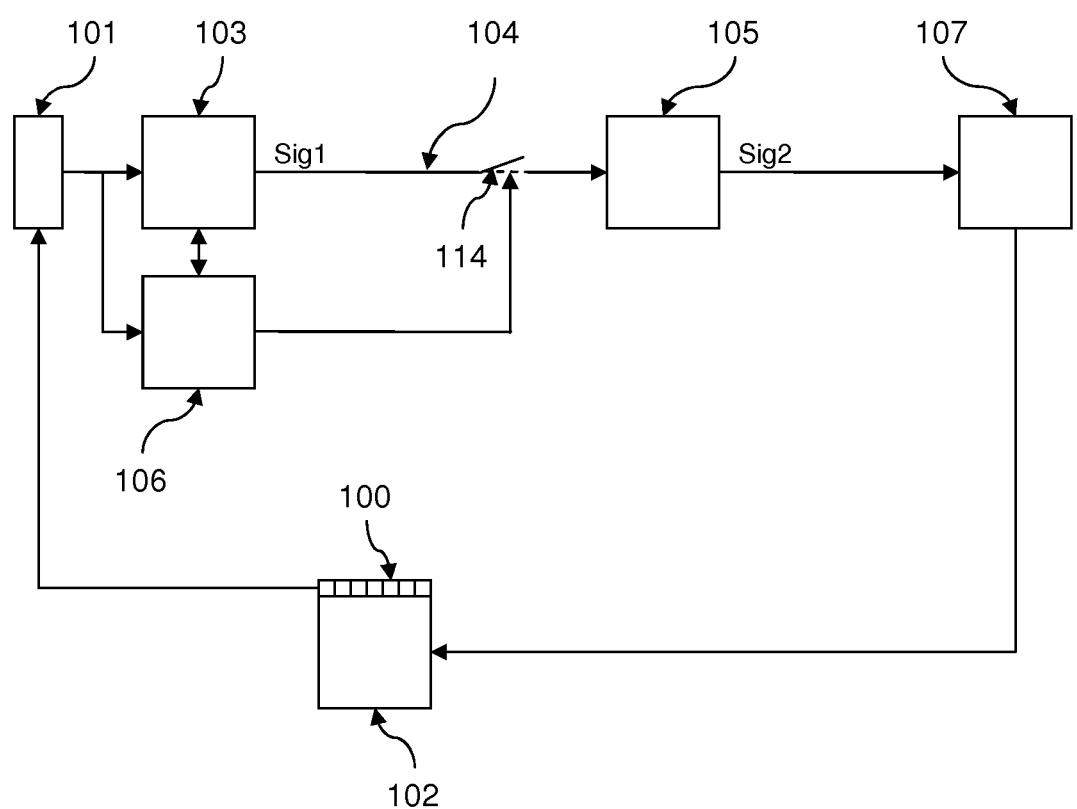

SYSTEM AND METHOD FOR CONTROLLING A ROBOT

CROSS-REFERENCE TO RELATED APPLICATIONS

This application is the U.S. National Phase of International Patent Application No. PCT/EP2017/059562, filed on 21 Apr. 2017, which claims benefit of German Patent Application No. 102016005026.8, filed on 24 Apr. 2016, the contents of which are incorporated herein by reference in their entirety.

BACKGROUND

Field

The invention relates to a system and a method of controlling a robot. The invention further relates to a robot with such a system. The proposed system and method serve in particular to increase the functional safety during operation of the robot.

Related Art

Today, robots with movable parts (one or more robot manipulators, etc.) are increasingly used in areas where the robots complete tasks interacting with humans Here, it is necessary to design the robots such that they have a high functional safety and a high safety integrity.

SUMMARY

The object of the invention is to provide a system and a method of controlling a robot that allow an improved functional safety and safety integrity of the robot during operation.

The invention will become apparent from the features of the independent claims Advantageous further developments and embodiments are the subject matter of the dependent claims Other features, possible applications and advantages of the invention will become apparent from the following description, as well as the explanation of example embodiments of the invention shown in the figures.

A first aspect of the invention relates to a system for controlling a robot. The robot includes an interface that provides data DAT(t), captured by one or more sensors, that indicate a current state ZUS(t) of the robot, a first processor, connected to the interface, that is set up to use a first algorithm to check, on the basis of the data DAT(t) and a prescribed state space Z, which indicates exclusively permitted states of the robot, whether it holds that: $ZUS(t) \in Z$, wherein in the event of: $ZUS(t) \notin Z$ a first stop signal is generated, a unit, connected to the first processor via a data link, for generating a second stop signal, wherein the second stop signal is generated when the unit receives the first stop signal or when the data link is interrupted, a second processor, connected to the interface and the first processor or only to the first processor, that is set up to use a second algorithm to check, on the basis of the data DAT(t) and the prescribed state space Z, whether it holds that: $ZUS(t) \in Z$, wherein in the event of $ZUS(t) \notin Z$ the data link between the first processor and the unit is interrupted, and a control unit, connected to the unit, for controlling the robot that controls the robot into a prescribed safe state when the second stop signal is present.

Herein, the term "current state ZUS(t) of the robot" is understood broadly. It includes, in particular, a static and/or dynamic mechanical and/or electric current state ZUS(t) of the robot. The term further includes states, where the robot interacts mechanically or electrically with its environment. Corresponding sensors for capturing the parameters defining the current state ZUS(t) and for generating the corresponding data DAT(t) are known in the prior art. In particular, the current state ZUS(t) is to be understood as a multidimensional vector having individual state parameters. The data DAT(t) indicate the values of the state parameters defining the state ZUS(t). The current state ZUS(t) and the associated data DAT(t) are both time dependent, wherein t indicates the time.

The data DAT(t) defining the current state ZUS(t) are provided to the first processor via an interface. In addition, the first processor is provided with the state space Z or the boundary for the state space Z, wherein the state space Z indicates exclusively permitted states of the robot. The state space Z can also be provided to the first processor as a parametric description of the permitted states. The first processor executes a first algorithm that checks, on the basis of the data DAT(t) and the prescribed state space Z, whether the current state ZUS(t) is an element of the state space Z. If this check reveals that the current state ZUS(t) is not an element of the state space Z, a first stop signal is generated. The first stop signal is preferably an electric or optical signal.

The first processor is further connected to the unit via a data link for generating a second stop signal. This data link is advantageously designed for signal routing of electric and optical signals. This data link is advantageously designed as an Ethernet connection. In particular, this data link is set up and designed to transmit the first stop signal, generated by the first processor, to the unit. According to the invention, the unit is further designed and set up such that, if it receives a first stop signal sent by the first processor or if the unit determines that the data link to the first processor is interrupted, the unit generates a second stop signal. For this purpose, the unit is advantageously set up to monitor the presence of an uninterrupted data link between the first processor and the unit, for example, on the basis of data transmission via a safety data protocol.

According to the invention, the second stop signal is transmitted to the control unit of the robot and prompts the control unit to control the robot into a prescribed safe state. Herein, the control unit, in particular, controls the actuators of elements of the robot that are driven by actuators. Advantageously, the control unit is the central control unit of the overall robot, which thus controls or regulates all controllable functions and states of the robots. The control unit can further include locally distributed control units, that, for example, each include the control electronics units locally assigned to the actuators.

Herein, the term "safe state" is understood broadly. For example, it includes braking all movable parts of the robot to a prescribed position or braking all movable parts of the robot to a standstill without prescription of a position, or reducing the movement speed of the movable parts of the robot to a prescribed speed, etcetera. In addition, the "safe state" can include a safe electric and/or data-related state. For example, after receiving the second stop signal, the control unit can prompt a data backup and/or electrically isolate specific subunits of the robot system, etcetera. In one variant, the second stop signal is transmitted to actuator units of the robot. The safe state is advantageously prescribed according to the task of the robot and advantageously meets the condition that, in the safe state, the robot does not pose any risk for its environment or the robot itself.

According to the invention, the second processor is connected to the interface and the first processor or only to the first processor, so that the second processor receives the data DAT(t) defining the current state ZUS(t) either from the interface or from the first processor, as well. The second processor executes a second algorithm, which is used to check, on the basis of a prescribed state space Z', whether the current state ZUS(t) is an element of the state space Z'. If it is determined that the current state ZUS(t) is not an element of the state space Z', the second processor prompts an interruption of the data link between the first processor and the unit. For this purpose, the second processor advantageously controls an interruption element, for example, a switch, that advantageously physically interrupts the data link. As an alternative to a physical interruption of the data link, an interruption of the data link can, for example, also be generated by generating a short circuit of all electric lines of the data link against a prescribed fixed potential.

The state spaces Z and Z' are advantageously selected such that it is ensured that checking of a state ZUS(t) by the first processor and the second processor leads to a consistent result. The state spaces Z can also Z' be identical.

An advantageous further development of the proposed system is characterized in that the second processor is set up on the first processor for monitoring the execution of the first algorithm, wherein the second processor, upon establishing a faulty execution of the first algorithm, advantageously interrupts the data link between the first processor and the unit.

Monitoring of the first processor by the second processor advantageously includes firstly monitoring whether the first processor executes the first algorithm at all or not, as well as secondly monitoring whether the first processor executes the first algorithm without fault. In the event of a non-execution of the first algorithm (for example, because the algorithm encountered a fault or the processor is damaged) by the first processor or in the event of a faulty execution of the first algorithm by the first processor, the data link between the first processor and the unit is advantageously interrupted by the first processor. As mentioned above, this event results in the generation of a second stop signal and, as a consequence, in the robot assuming the safe state.

An advantageous further development of the proposed system is characterized in that the first processor is set up on the second processor for monitoring the execution of the second algorithm, wherein the first processor, upon establishing a faulty execution of the second algorithm (which advantageously includes a non-execution), generates a first stop signal and/or a warning signal. If the first stop signal is generated, it is transmitted to the unit, where it generates the second stop signal, as a consequence of which the robot assumes the safe state. The warning signal is advantageously transmitted to an output unit, which is set up and designed to output the warning signal as an optically perceptible signal and/or acoustically perceptible signal. If the second processor in this further development interrupts the data link between the first processor and the unit due to a fault in the execution of the second algorithm, then the control of the robot is functionally safe. If a fault occurs in the execution of the second algorithm by the second processor that, however, does not result in an interruption of the data link between the first processor and the unit, in this further development, this is detected by the first processor, so that the first processor generates a first stop signal and transmits it to the unit via the data link, so that this generates a second stop signal that prompts the robot to be transferred into a safe state.

An advantageous further development of the proposed system is characterized in that, there is a switch controlled by the second processor to interrupt the data link between the first processor and the unit. The switch is advantageously designed as an electric or optical switch. In a switching status that corresponds to the interruption of the data link, the switch can also generate a short circuit of the electric data line. The data link is advantageously physically interrupted by the switch. The data link is advantageously a symmetrically encoded data link. These data links ensure safe data transmission.

The second processor is advantageously arranged on a unit, such as, for example, a plug-in card or an extension module, that is provided as an extension of the first processor as a standard.

A particularly advantageous further development of the proposed system is characterized in that a second chip set of the second processor is connected to a first chip set of the first processor via a PCI, PCI-X or PCIe connection or similar technical solutions. Herein, the term "PCI" ("Peripherical Component Interconnect") refers to a bus standard for connecting peripheral devices to a chip set of a processor. The second processor is advantageously arranged on a PCI card that is inserted on the main board of the first processor. The first and the second chip set are advantageously arranged on an integrated processor chip.

Also advantageously, the first and the second processor are different processor types.

Also advantageously, the first algorithm and the second algorithm are different algorithms or at least different programming in one and the same algorithm. By different processor types or differently executed algorithms, the functional safety of the system for controlling a robot can be significantly increased. If the first algorithm and the second algorithm are different, this generally requires different state spaces Z and Z'. As already described above, these are advantageously selected such that it is ensured that checking of a state ZUS(t) by the first processor and the second processor leads to a consistent result.

In particular, the proposed system allows to realize continuously increasing requirements for robot controls regarding the functional safety by a simple and cost-efficient system.

If the second processor is designed as a PCI card, the following advantages are obtained in particular:

1. reduced installation effort, as no cables are required. and an integrated energy supply can be used, 2. there is no risk of confusion with other, for example, Ethernet connections, as no additional connections are required, 3. a high data throughput is enabled, which in turn allows the exchange of complex data without significant time delay, so that complex safety checks are possible, and 4. use of both processors (first and second processor) to increase the computing performance is possible due to the high data throughput.

The connection between the first processor and the unit is advantageously implemented as an Ethernet connection. An Ethernet controller for a fieldbus for controlling the robot is advantageously arranged on the second processor, but is logically assigned to the first processor. Thus, a standard controller can be used from the first processor, so that no changes to the software used on the first processor for the data link are required (transparent coupling). An analogue switch, controlled by the second processor, is advantageously provided for interrupting the Ethernet connection between the first processor and the unit. This analogue switch can physically interrupt the Ethernet connection. Thus, bypassing of the switch-off by the Ethernet controller is not possible. Due to the analogue switch being controlled by the second processor, a real independent hardware path for a second channel in the system is available. This results in reduced loading times compared to solutions with distributed computing of safe data packages for controlling the robot. The safe signal is generated by switching off or interrupting the communication between the first processor and the unit. The second processor is advantageously not required to contribute output data to the control unit within a bus cycle. In particular, the proposed system allows the safe switch-off of the robot to be addressed in a simple manner. The robot must be able to address the event of an interrupted communication anyway, as it may be caused by faults in the connection cable. In this event, the robot automatically assumes the safe state.

The proposed system as a whole allows a control of a robot with increased functional safety.

Another aspect of the present invention relates to a robot with a system as described above.

Another aspect of the present invention relates to a method of (safely) controlling a robot. The proposed method includes the following steps.

In one step, data DAT(t) indicating a current state ZUS(t) of the robot, captured by one or more sensors, are provided by an interface. In another step, a first algorithm, executed on a first processor, is used to check, on the basis of the data DAT(t) and a prescribed state space Z or the boundary for the state space Z, which indicates exclusively permitted states of the robot, whether it holds that: ZUS(t)∈Z, wherein in the event of: ZUS(t)∉Z a first stop signal Sig1 is generated. In another step, a unit, connected to the first processor via a data link, generates a second stop signal Sig2 when the unit receives the first stop signal Sig1 or when the data link is interrupted. In another step, a second processor, connected to the interface and the first processor or only to the first processor, uses a second algorithm, executed on the second processor, to check, on the basis of the data DAT(t) and a prescribed state space Z', whether it holds that: ZUS(t)∈Z' wherein in the event of ZUS(t)∉Z' the data link between the first processor and the unit is interrupted. In another step, a control unit, connected to the unit, for controlling the robot controls the robot into a prescribed safe state when the second stop signal Sig2 from the control unit is present.

Advantages and advantageous further developments of the proposed method will become apparent by a similar and analogous transfer of the statements made in connection with the proposed system.

The object of the invention is further achieved by a computer system with a data processing apparatus, wherein the data processing apparatus is designed such that a method, as described above, is executed on the data processing apparatus.

In addition, the object of the invention is achieved by a digital storage medium with electronically readable control signals, wherein the control signals can interact with a programmable computer system in such a way that a method, as described above, is executed.

The object of the invention is further achieved by a computer program product with program code for executing the method, as described above, stored on a machine-readable medium, if the program code is executed on a data processing apparatus.

Finally, the invention relates to a computer program with program codes for executing the method, as described above, if the program runs on a data processing apparatus. For this purpose, the data processing apparatus can be designed as any known computer system known from the prior art.

Other advantages, features and details will become apparent from the following description, in which at least one example embodiment is described in detail, with reference to the drawings, if applicable. Like, similar, and/or analogue parts are indicated by like reference numerals.

BRIEF DESCRIPTION OF THE DRAWINGS

In the drawings:

FIG. 1 shows a schematic diagram of a variant of the proposed system.

DETAILED DESCRIPTION

FIG. 1 shows a schematic diagram of a variant of the proposed system for controlling a robot 102. Here, the robot 102 has a multi-membered robot manipulator driven by an actuator. The system further includes an interface 101 that provides data DAT(t), captured by several sensors 100, that indicate a current state ZUS(t) of the robot manipulator. In the present example embodiment, the state ZUS(t) indicates forces and torques occurring at the individual members of the robot manipulator, wrenches acting externally on the individual members, as well as positions, orientations, speeds, and accelerations of the individual members.

The interface 101 is connected to the first processor 103. The data DAT(t) indicating the current state ZUS(t) are thus provided to the first processor 103. The first processor 103 executes a first algorithm that checks, on the basis of the provided data DAT(t) and a prescribed state space Z, which indicates exclusively permitted states of the robot 102 or the robot manipulator, whether the current state ZUS(t) is an element (∈) of the state space Z: ZUS(t)∈Z. If it is determined that it holds that: ZUS(t)∉Z, a first electric stop signal Sig1 is generated.

The system further includes a unit 105, connected to the first processor 103 via a data link 104, that serves for generating a second electric stop signal Sig2, wherein the second stop signal Sign2 is generated by the unit when the unit 105 receives the first stop signal Sig1 or when the unit 105 establishes that the data link 104 is interrupted.

The interface 101 is further connected to a second processor 106 that has a different chip set or a processor with a different processor architecture than the first processor 103. The first processor 103 and second 106 processor are thus of a different design. The interface 101 simultaneously provides the second processor 106 with the data DAT(t). The second processor 106 is set up to use a second algorithm to check, on the basis of the data DAT(t) and a prescribed state space Z', whether it holds that: ZUS(t)∈Z', wherein in the event of ZUS(t)∉Z' the data link 104 between the first processor 103 and the unit 105 is interrupted by controlling an analogue switch 114. The first algorithm is different from the second algorithm, however, both algorithms perform the checks described above.

Finally, the system includes a control unit 107, connected to the unit 105, for controlling the robot 102, which controls the robot 102 into a prescribed safe state when it receives the second stop signal Sig2.

Although the invention has been further illustrated and explained by way of preferred example embodiments, the invention is not limited by the disclosed examples and other variations can be derived therefrom by the person skilled in the art, without departing from the scope of the invention. It is thus understood that a plurality of possible variations exists. It is also understood that embodiments presented by way of example are really merely examples that should not be construed as limiting the scope, the possible applications or the configuration of the invention in any way. The above description and the description of the figures rather enable the person skilled in the art to concretely implement the example embodiments, wherein the person skilled in the art, having knowledge of the disclosed inventive concept, can make numerous changes, for example, with respect to the function or the arrangement of individual elements, mentioned in an example embodiment, without departing from the scope defined by the claims and their legal equivalences, such as further explanations in the description.

LIST OF REFERENCE NUMERALS

100 Sensors
101 Interface
102 Robot
103 First processor
104 Data link between the first processor and the unit
105 Unit
106 Second processor
107 Control unit
114 Interruption unit/switch

The invention claimed is:

1. A system for controlling a robot, the system comprising:
an interface that provides data DAT(t) captured by one or more sensors, wherein the data DAT(t) indicate a current state ZUS(t) of the robot;
a first processor connected to the interface, the first processor is set up to use a first algorithm to check, based on the data DAT(t) and a prescribed state space Z or a boundary for the state space Z, which indicates exclusively permitted states of the robot, whether ZUS(t)∈Z, wherein in an event of ZUS(t)∉Z a first stop signal Sig1 is generated;
a unit connected to the first processor via a data link, the unit serves to generate a second stop signal Sig2 when the unit receives the first stop signal Sig1 or when the unit establishes that the data link is interrupted;
a second processor connected to the interface and the first processor or only to the first processor, the second processor is set up to use a second algorithm to check, based on the data DAT(t) and a prescribed state space Z' or a boundary for the state space Z', whether ZUS(t)∈Z', wherein in an event of ZUS(t)∉Z' the second processor prompts an interruption unit to interrupt the data link between the first processor and the unit; and
a control unit connected to the unit, the control unit to control the robot, the control unit further to control/regulate the robot into a prescribed safe state when the second stop signal Sig2 is present.

2. The system according to claim 1, wherein the second processor is set up to monitor execution of the first algorithm on the first processor, wherein the second processor, upon establishing a faulty execution of the first algorithm, interrupts the data link.

3. The system according to claim 1, wherein the first processor is set up to monitor execution of the second algorithm on the second processor, wherein the first processor, upon establishing a faulty execution of the second algorithm, generates a first stop signal Sig1 and/or a warning signal.

4. The system according to claim 3, further comprising an output unit, wherein the output unit is set up and designed to output the warning signal as an optically perceptible signal and/or acoustically perceptible signal.

5. The system according to claim 1, wherein the interruption unit is a switch controlled by the second processor.

6. The system according to claim 1, wherein a second chip set of the second processor is connected to a first chip set of the first processor via a PCI, PCI-X or PCIe connection.

7. The system according to claim 1, wherein the first processor and the second processor are different processor types.

8. The system according to claim 1, wherein the first algorithm and the second algorithm are different algorithms.

9. The method according to claim 8, further comprising:
monitoring via the second processor execution of the first algorithm on the first processor; and
upon establishing a faulty execution of the first algorithm, interrupting via the second processor the data link between the unit to the first processor.

10. The method according to claim 9, further comprising outputting via an output unit the warning signal as an optically perceptible signal and/or acoustically perceptible signal.

11. The method according to claim 10, wherein the interruption unit is a switch controlled by the second processor.

12. The method according to claim 8, further comprising:
monitoring via the first processor execution of the second algorithm on the second processor; and
upon establishing a faulty execution of the second algorithm, generating via the first processor a first stop signal Sig1 and/or a warning signal.

13. The method according to claim 8, wherein executing the second algorithm on the second processor prompts an interruption unit to interrupt the data link between the first processor and the unit.

14. The method according to claim 8, wherein the first processor and the second processor are different processor types.

15. The method according to claim 8, wherein the first algorithm and the second algorithm are different algorithms.

16. A robot with a system according to claim 1.

17. A method of controlling a robot, the method comprising:
providing via an interface data DAT(t) indicating a current state ZUS(t) of the robot, the data DAT(t) captured by one or more sensors;
executing a first algorithm on a first processor to check, based on the data DAT(t) and a prescribed state space Z or a boundary for the state space Z, which indicates exclusively permitted states of the robot, whether ZUS(t)∈Z, and to generate a first stop signal Sig1 in an event of ZUS(t)∉Z;
generating via a unit a second stop signal Sig2 when the unit receives the first stop signal Sig1 or when a data link that connects the unit to the first processor is interrupted;
executing a second algorithm on the second processor to check, based on the data DAT(t) and a prescribed state space Z' or a boundary for the state space Z', whether ZUS(t)∈Z', and to interrupt the data link between the first processor and the unit in an event ZUS(t)∉Z', the second processor connected to the interface and the first processor or only to the first processor; and controlling via control unit the robot, and further controlling/regulating the robot into a prescribed safe state when the second stop signal Sig2 from the control unit is present, the control unit connected to the unit.

\* \* \* \* \*